United States Patent
Oyanagi et al.

(10) Patent No.: US 8,801,168 B2
(45) Date of Patent: *Aug. 12, 2014

(54) PIGMENT DISPERSION, INK COMPOSITION, INKSET, AND RECORDING DEVICE

(71) Applicant: Seiko Epson Corporation, Tokyo (JP)

(72) Inventors: Takashi Oyanagi, Shiojiri (JP); Keitaro Nakano, Matsumoto (JP)

(73) Assignee: Seiko Epson Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/012,385

(22) Filed: Aug. 28, 2013

(65) Prior Publication Data

US 2013/0342606 A1 Dec. 26, 2013

Related U.S. Application Data

(60) Continuation of application No. 13/438,009, filed on Apr. 3, 2012, now Pat. No. 8,545,003, which is a division of application No. 13/332,672, filed on Dec. 21, 2011, which is a division of application No. 13/081,574, filed on Apr. 7, 2011, now Pat. No. 8,591,019, which is a division of application No. 12/816,404, filed on Jun. 16, 2010, now Pat. No. 7,971,985, which is a division of application No. 12/002,899, filed on Dec. 19, 2007, now Pat. No. 7,763,108.

(30) Foreign Application Priority Data

Dec. 19, 2006 (JP) ................................ 2006-340894
Dec. 19, 2006 (JP) ................................ 2006-340899
Aug. 13, 2007 (JP) ................................ 2007-210976

(51) Int. Cl.
*B41J 2/01* (2006.01)
*B41J 2/21* (2006.01)

(52) U.S. Cl.
CPC . *B41J 2/01* (2013.01); *B41J 2/2107* (2013.01)
USPC ........................................... 347/100; 347/95

(58) Field of Classification Search
CPC ............ B41J 2/01; B41J 2/211; B41J 2/1433; B41J 2/17; B41J 2/17593; B41J 2/2107; B41J 2/1755; B41J 2/2114; B41J 11/0015; B41J 2/2056; B41J 2/21; C09D 11/36; C09D 11/40; C09D 11/30; C09D 11/38; C09D 11/322; C09D 11/328; C09D 11/101
USPC ......... 347/100, 95, 96, 101, 102, 105, 21, 20, 347/9; 106/31.6, 31.27, 31.13; 523/160, 523/161
See application file for complete search history.

(56) References Cited

U.S. PATENT DOCUMENTS 3,023,181 A 2/1962 Te Grotenhuis
3,328,481 A 6/1967 Vincent
(Continued)

FOREIGN PATENT DOCUMENTS

DE 102005037611 A1 2/2007
EP 1862511 A1 12/2007
(Continued)

OTHER PUBLICATIONS

U.S. Appl. No. 12/002,884, filed Dec. 19, 2007, Takashi Oyanagi et al.

(Continued)

*Primary Examiner* — Manish S Shah
(74) *Attorney, Agent, or Firm* — Harness, Dickey & Pierce, P.L.C.

(57) ABSTRACT

A pigment dispersion containing a metal pigment, wherein the metal pigment contains plate-like particles, and in the case where the longitudinal diameter on the planar surface of the plate-like particle is X, the lateral diameter is Y, and the thickness is Z, the 50% average particle diameter R50 of a corresponding circle determined from the surface area in the X-Y plane of the plate-like particle is between 0.5 and 3 μm, and the condition R50/Z>5 is satisfied.

16 Claims, 2 Drawing Sheets

(56) References Cited

U.S. PATENT DOCUMENTS

| | | | |
|---|---|---|---|
| 3,821,003 A | 6/1974 | Dittrich et al. | |
| 4,213,886 A | 7/1980 | Turner | |
| 4,657,067 A | 4/1987 | Rapp et al. | |
| 5,156,677 A | 10/1992 | Carpenter et al. | |
| 5,340,393 A | 8/1994 | Jacobson | |
| 5,415,964 A | 5/1995 | Hayashi et al. | |
| 5,431,720 A | 7/1995 | Nagai et al. | |
| 5,436,083 A | 7/1995 | Haluska et al. | |
| 5,436,084 A | 7/1995 | Haluska et al. | |
| 5,624,486 A | 4/1997 | Schmid et al. | |
| 5,707,433 A | 1/1998 | Kuge et al. | |
| 5,719,204 A | 2/1998 | Beach et al. | |
| 5,725,647 A | 3/1998 | Carlson et al. | |
| 5,873,934 A | 2/1999 | Kunii et al. | |
| 5,900,899 A | 5/1999 | Ichizawa et al. | |
| 5,935,638 A | 8/1999 | Chandra et al. | |
| 5,954,866 A | 9/1999 | Ohta et al. | |
| 5,961,703 A | 10/1999 | Fraas | |
| 6,054,220 A | 4/2000 | Mroz | |
| 6,099,629 A | 8/2000 | Morita et al. | |
| 6,162,497 A | 12/2000 | Beane et al. | |
| 6,176,918 B1 | 1/2001 | Glausch et al. | |
| 6,308,040 B1 | 10/2001 | Mizuno | |
| 6,582,763 B1 | 6/2003 | Nishimura et al. | |
| 6,709,095 B2 | 3/2004 | Sago et al. | |
| 6,783,222 B2 | 8/2004 | Kato et al. | |
| 6,821,329 B2 | 11/2004 | Choy | |
| 6,838,495 B2 | 1/2005 | Gatti et al. | |
| 6,902,267 B2 | 6/2005 | Ohya et al. | |
| 6,951,075 B2 | 10/2005 | Babler et al. | |
| 6,997,979 B2 | 2/2006 | Bauer et al. | |
| 7,125,447 B2 | 10/2006 | Sugita et al. | |
| 7,166,271 B2 | 1/2007 | Zapf et al. | |
| 7,303,619 B2 | 12/2007 | Oyanagi | |
| 7,381,758 B2 | 6/2008 | Vuarnoz et al. | |
| 7,419,538 B2 | 9/2008 | Li et al. | |
| 7,449,239 B2 | 11/2008 | Seeger et al. | |
| 7,604,693 B2 | 10/2009 | Oyanagi et al. | |
| 7,622,157 B2 | 11/2009 | Falk et al. | |
| 7,645,404 B2 | 1/2010 | Paar et al. | |
| 7,763,108 B2 * | 7/2010 | Oyanagi et al. | 106/31.86 |
| 7,919,032 B2 | 4/2011 | Yamaguchi et al. | |
| 7,971,985 B2 * | 7/2011 | Oyanagi et al. | 347/100 |
| 8,313,572 B2 | 11/2012 | Oyanagi et al. | |
| 8,361,217 B2 | 1/2013 | Voit et al. | |
| 8,511,814 B2 * | 8/2013 | Oyanagi et al. | 347/100 |
| 8,545,003 B2 * | 10/2013 | Oyanagi et al. | 347/100 |
| 2003/0055127 A1 | 3/2003 | Chen et al. | |
| 2003/0083453 A1 | 5/2003 | Lukacs et al. | |
| 2003/0231234 A1 | 12/2003 | Ushirogouchi et al. | |
| 2004/0041893 A1 | 3/2004 | Hoshino | |
| 2004/0130606 A1 | 7/2004 | Tawaraya et al. | |
| 2004/0257420 A1 | 12/2004 | Ichizawa et al. | |
| 2004/0266907 A1 | 12/2004 | Sugita et al. | |
| 2005/0074611 A1 | 4/2005 | Kuehnle et al. | |
| 2005/0090581 A1 | 4/2005 | Oyanagi | |
| 2005/0148685 A1 | 7/2005 | Yamamoto | |
| 2005/0150424 A1 | 7/2005 | Kasai | |
| 2005/0150864 A1 | 7/2005 | Stasiak et al. | |
| 2005/0151815 A1 | 7/2005 | Kanai et al. | |
| 2005/0166795 A1 | 8/2005 | Ito et al. | |
| 2005/0279255 A1 | 12/2005 | Suzuki et al. | |
| 2006/0111466 A1 | 5/2006 | Bujard et al. | |
| 2006/0142415 A1 | 6/2006 | Ylitalo et al. | |
| 2006/0150864 A1 | 7/2006 | Hashizume et al. | |
| 2006/0167138 A1 | 7/2006 | Ishii et al. | |
| 2007/0026224 A1 | 2/2007 | Seeger et al. | |
| 2007/0044684 A1 | 3/2007 | Nakano et al. | |
| 2007/0128438 A1 | 6/2007 | Fujiyasu et al. | |
| 2007/0251424 A1 | 11/2007 | Handrosch et al. | |
| 2008/0047463 A1 | 2/2008 | Tanoue et al. | |
| 2008/0145628 A1 | 6/2008 | Oyanagi et al. | |
| 2008/0249209 A1 | 10/2008 | Trummer et al. | |
| 2008/0250970 A1 | 10/2008 | Oyanagi et al. | |
| 2008/0318012 A1 | 12/2008 | Domnick et al. | |
| 2009/0162750 A1 | 6/2009 | Kawakami et al. | |
| 2009/0214833 A1 | 8/2009 | Oyanagi et al. | |
| 2009/0264575 A1 | 10/2009 | Henglein et al. | |
| 2010/0183809 A1 | 7/2010 | Oyanagi et al. | |
| 2010/0251929 A1 | 10/2010 | Kagata et al. | |
| 2010/0289859 A1 | 11/2010 | Oyanagi et al. | |
| 2010/0305245 A1 | 12/2010 | Brand et al. | |
| 2011/0025783 A1 | 2/2011 | Oyanagi et al. | |
| 2011/0181656 A1 | 7/2011 | Oyanagi et al. | |
| 2012/0098911 A1 * | 4/2012 | Oyanagi et al. | 347/100 |
| 2012/0103230 A1 | 5/2012 | Oyanagi et al. | |

FOREIGN PATENT DOCUMENTS

| | | |
|---|---|---|
| EP | 1942158 A2 | 7/2008 |
| EP | 2017310 A1 | 1/2009 |
| JP | 7-290639 A | 11/1995 |
| JP | 08-259847 | 10/1996 |
| JP | 8-283604 A | 10/1996 |
| JP | 11-323223 A | 11/1999 |
| JP | 2000-502401 A | 2/2000 |
| JP | 2001-026801 A | 1/2001 |
| JP | 2001-075367 A | 3/2001 |
| JP | 2001-164150 A | 6/2001 |
| JP | 2001-262003 A | 9/2001 |
| JP | 2002-179960 A | 6/2002 |
| JP | 2003-041150 A | 2/2003 |
| JP | 2003-049091 A | 2/2003 |
| JP | 2003-147226 A | 5/2003 |
| JP | 2003-292836 A | 10/2003 |
| JP | 2003-306625 A | 10/2003 |
| JP | 2004-099841 A | 4/2004 |
| JP | 2004-131542 A | 4/2004 |
| JP | 2004-155979 A | 6/2004 |
| JP | 2004-292690 A | 10/2004 |
| JP | 2005-014330 A | 1/2005 |
| JP | 2005-501955 A | 1/2005 |
| JP | 2005-068250 A | 3/2005 |
| JP | 2005-068251 A | 3/2005 |
| JP | 2005-162771 A | 6/2005 |
| JP | 2006-137864 A | 6/2006 |
| JP | 2007-138053 A | 6/2007 |
| JP | 2007-204692 A | 8/2007 |
| JP | 2007-297621 A | 11/2007 |
| JP | 2008-516023 A | 5/2008 |
| JP | 2008-174712 A | 7/2008 |
| JP | 2008-201624 A | 9/2008 |
| JP | 2008-201821 A | 9/2008 |
| JP | 2008-201991 A | 9/2008 |
| JP | 2008-208332 A | 9/2008 |
| JP | 2009-122650 A | 6/2009 |
| JP | 2010-202709 A | 9/2010 |
| WO | WO-98/13426 A1 | 4/1998 |
| WO | WO-03/020834 A1 | 3/2003 |
| WO | WO-2004/035684 A2 | 4/2004 |
| WO | WO-2004/096921 A1 | 11/2004 |
| WO | WO-2005/063897 A2 | 7/2005 |
| WO | WO-2005/111159 A1 | 11/2005 |
| WO | WO-2006/101054 A1 | 9/2006 |
| WO | WO-2007/020364 A1 | 2/2007 |
| WO | WO-2007/045452 A2 | 4/2007 |
| WO | WO-2009/015788 A2 | 2/2009 |

OTHER PUBLICATIONS

U.S. Appl. No. 12/690,131, filed Jan. 20, 2010, Takashi Oyanagi et al.
U.S. Appl. No. 12/690,293, filed Jan. 20, 2010, Takashi Oyanagi et al.
U.S. Appl. No. 12/778,496, filed May 12, 2010, Takashi Oyanagi et al.
U.S. Appl. No. 12/731,206, filed Mar. 25, 2010, Tsuyoshi Sano et al.
U.S. Appl. No. 12/755,120, filed Apr. 6, 2010, Takayoshi Kagata et al.
U.S. Appl. No. 13/675,018, filed Nov. 13, 2012, Takayoshi Kagata et al.
U.S. Appl. No. 12/755,134, filed Apr. 6, 2010, Takayoshi Kagata et al.
U.S. Appl. No. 12/002,899, filed Dec. 19, 2007, Takashi Oyanagi et al.
U.S. Appl. No. 12/816,404, filed Jun. 16, 2010, Takayoshi Kagata et al.
U.S. Appl. No. 12/755,109, filed Apr. 6, 2010, Takayoshi Kagata et al.

(56) References Cited

OTHER PUBLICATIONS

U.S. Appl. No. 13/306,164, filed Mar. 1, 2010, Takayoshi Kagata et al.
Office Action in Copending U.S. Appl. No. 13/081,574 issued Sep. 21, 2011.
Extended European Search Report of European Application 11001190.5 Issued Nov. 3, 2011.
European Search Report in respect of counterpart EP Application No. 10159206.1 5 pages, issued Jun. 2, 2010.
European Search Report in respect of counterpart EP Application No. 10159208.7 6 pages, issued Jun. 14, 2010.
BASF Pigment Disperser MD 20 Technical Information (Jul. 2003).
Berict der Fa. Eckart uber Herstellung eines Metalleffektpigments.
Berict der Fa. Eckart zu den ermittelten GroBenwerten.
Berict der Fa. Eckart zur Auswertung der GroBenverteilungsdaten.
Extended Search Report of European Application 10014034.2 Issued May 4, 2011.
Hartung, "Lehr-und Handbuch der angewandten Statistik" Muchen: Oldenbourg, 2005.
Kittel, H., "Lehrbuch der Lacke und Beschichtungen, Band 5" Leipzig: S. Hirzel Verlag Stuttgart, 2003.
Li et al., "Aluminum Pigments Encapsulated by Inorganic-Organic Hybrid Coatings and Their Stability in Alkaline Aqueous Media," J. Coat. Technol. Res., 5(1)77-83, 2008.
Office Action in Copending U.S. Appl. No. 13/081,574.
Partial European Search Report of European Application 07024537.8 issued Apr. 15, 2008.
Extended European Search Reported Issued Nov. 3, 2011.
Partial European Search Report of Application 10016140.5 Issued May 24, 2011.
Partial European Search Report of European Application 07024538.6 issued Apr. 15, 2008.
European Search Report in respect of counterpart EP Application No. 10159206.1 5 pages, Jun. 2010.
European Search Report in respect of counterpart EP Application No. 10159208.7 6 pages, Jun. 2010.

\* cited by examiner

Fig1

PIGMENT DISPERSION, INK COMPOSITION, INKSET, AND RECORDING DEVICE

CROSS-REFERENCE TO RELATED APPLICATIONS

This is a continuation application of U.S. application Ser. No. 13/438,009 filed Apr. 3, 2012 which is a divisional application of U.S. application Ser. No. 13/332,672 filed Dec. 21, 2011, which is a divisional application of U.S. application Ser. No. 13/081,574 filed Apr. 7, 2011, which is a divisional application of U.S. application Ser. No. 12/816,404 filed Jun. 16, 2010, now U.S. Pat. No. 7,971,985 issued Jul. 5, 2011, which is a divisional application of U.S. application Ser. No. 12/002,899 filed Dec. 19, 2007, now U.S. Pat. No. 7,763,108 issued Jul. 27, 2010, which claims priority to Japanese Patent Application Nos. 2007-210976 filed Aug. 13, 2007, 2006-340899 filed Dec. 19, 2006 and 2006-340894 filed Dec. 19, 2006 all of which are incorporated by reference in their entireties.

BACKGROUND

1. Technical Field

The present invention relates to a pigment dispersion, ink composition, ink set, and recording device, and particularly relates to a pigment dispersion, ink composition, ink set, and recording device which can form an image with metallic gloss.

2. Related Art

Conventionally, gold bronze powder made of brass and aluminum fine powders and the like, printing ink with silver powder pigment, foil press printing using metal foil, and a thermal transfer method using a metal foil have been used to form a coating film with metallic gloss of printed matter.

However, with a coating film consisting of a printing ink that uses gold bronze powder, or silver powder, the average particle size of the metal powders that are used will be large, between 10 μm and 30 μm, and thus a flat metallic gloss finish can be obtained, but achieving a mirror gloss is difficult. Furthermore, with the foil press or thermal transfer methods that use a metallic foil, an adhesive is applied as a printing medium, and a flat metallic foil is pressed thereon, the recording medium and the metallic foil are heated to cause firm adhesion, and the metal foil and recording medium are thermally welded together. Therefore, a relatively good gloss can be achieved, but there are many manufacturing steps, and pressure and heat are applied during the manufacturing process, so the recording medium is restricted to the limited recording media that are resistant to heat and deformation.

In recent years, many examples of applying inkjet technology to printing have been seen, and one example of this application is metallic printing. For example, JP-A-2002-179960 discloses technology of forming a metal film on the surface of plastic spherical particles, and printing an ink composition that contains a pigment using inkjet printing. However, in order to obtain a highly metallic gloss, the spheres must be deformed and flattened to make a smooth surface, and with this technology, heating and pressing with a roller must be simultaneously performed. Therefore, the equipment and manufacturing processes are inevitably complicated by this point, and the recording medium is also restricted.

Furthermore, JP-A-2003-292836 and JP-A-2003-306625 disclose technology that uses an ink composition wherein a colloid of a precious metal such as gold or silver is dispersed. However, if the particle size of the precious metal colloid is small, within a range between several nanometers and several tens of nanometers in order to give priority to dispersion and stability, discoloration caused by plasmon absorption will occur, and the ink composition will not provide a metallic gloss. In this case, after the coating film is dried, a metallic gloss is achieved by heating to a temperature of 150° C. or higher in order to fuse the colloid particles together. In addition, even if a metallic gloss can be achieved with these technologies, achieving a surface with a mirror surface metallic gloss where the specular gloss at 20°, 60°, and 85° exceeds 200, 200, and 100, respectively on a uniform surface without variation is difficult. Furthermore, if the particle size is increased in order to give priority to metallic gloss, the dispersion stability will be degraded, and problems with conglomeration and settling will be inevitable, and the storage life of the ink composition will be significantly reduced. Furthermore, although trivial, using precious metals as a material will increase the cost of the ink composition, so use will be restricted to applications with high added value, and there are disadvantages related to cost.

SUMMARY

An advantage of some aspects of the invention is the ability to provide a pigment dispersion with a high metallic mirror gloss using aluminum as a relatively inexpensive metal material, as well as to an ink composition, and recording device. Furthermore, another advantage of some aspects of the invention is the ability to provide an ink set capable of forming a coating film with different metallic gloss of printed matter by containing an ink set that includes ink compositions with different concentrations of metal pigments.

As result of diligent research, the present inventors have discovered that printed matter with a high mirror gloss which was heretofore unattainable can be obtained by using a metal pigment dispersion, ink composition, ink set and recording device that use specific metal pigments. The present invention is based on these findings, and provides the following inventions.

(1) A pigment dispersion comprising a metal pigment, wherein the metal pigment contains plate-like particles, and in the case where the longitudinal diameter on the planar surface of the plate-like particle is X, the lateral diameter is Y, and the thickness is Z, the 50% average particle diameter R50 of a corresponding circle determined from the surface area in the X-Y plane of the plate-like particle is between 0.5 and 3 μm, and the condition R50/Z>5 is satisfied.

(2) The pigment dispersion according to (1), wherein the maximum particle diameter Rmax of a corresponding circle determined from the surface area in the X-Y plane of the plate-like particle is 10 μm or less;

(3) The pigment dispersion according to (1), wherein the metal pigment is aluminum or an aluminum alloy;

(4) The pigment dispersion according to (1), wherein the metal pigment is made by crushing a metal deposition film;

(5) The pigment dispersion according to (1), wherein the particle size distribution CV value of the metal pigment as determined by the following equation is 60 or less;

$$CV\ value = \text{standard deviation of particle size distribution/average particle diameter} \times 100; \quad \text{Equation 1}$$

(6) An ink composition, comprising: the pigment dispersion according to any one of (1) through (5), an organic solvent, and a resin;

(7) The ink composition according to (6), wherein the concentration of the metal pigment in the ink composition is between 0.1 and 3.0 wt %;

(8) The ink composition according to (6), wherein the organic solvent includes one or more types of alkylene glycol ether that is a liquid at ambient temperature and pressure;

(9) The ink composition according to (6), wherein the organic solvent is a blend of an alkylene glycol diether, an alkylene glycol monoether, and a lactone;

(10) The ink composition according to (6), wherein the resin is at least one type of resin selected from a group consisting of polyvinyl butyral, cellulose acetatobutyrate, and polyacryl polyol;

(11) The ink composition according to (6), further comprising at least one type of acetylene glycol based surfactant and/or silicone based surfactant;

(12) The ink composition according to (6), wherein when applied to an inkjet recording device that satisfies the condition of $L \geq 5W$ where $L$ μm is the nozzle diameter of an inkjet head and $W$ μm is the size of a mesh filter opening provided in an ink flow path, the number of plate-like particles where the average particle diameter $R$ μm of a corresponding circle determined from the surface area in the X-Y plane of the plate-like particles satisfies the condition $R>(L/5)$ is no more than 5% of the total number of plate-like particles;

(13) An ink set, comprising a plurality of the ink compositions according to any one of (1), wherein each of the ink compositions has a different concentration of metal pigment;

(14) The ink set according to (13), wherein the concentration of a metal pigment in at least one of the ink compositions is 0.1 wt. % or higher and less than 1.5 wt. %, and the concentration of a metal pigment in at least one of the other ink compositions is 1.5 wt. % or higher and 3.0 wt % or less;

(15) A recording device, comprising the ink set according to (13).

According to an aspect of the invention, an image with a high metal gloss (so-called metallic gloss) which was heretofore unobtainable can be obtained on a recording medium by using a metal pigment with a specific shape and restricted particle diameter.

DESCRIPTION OF EXEMPLARY EMBODIMENTS

Pigment Dispersion

The pigment dispersion of this aspect is a pigment dispersion that contains a metal pigment (hereinafter also referred to as "metallic pigment"), and this metallic pigment contains plate-like particles made by crushing a metal deposition film, and in the case where the longitudinal diameter on the planar surface of the plate-like particle is X, the lateral diameter is Y, and the thickness is Z, the 50% average particle diameter R50 of a corresponding circle determined from the surface area in the X-Y plane of the plate-like particle is between 0.5 and 3 μm, and the condition R50/Z>5 is satisfied.

The term "plate-like particle" refers to a particle which has essentially a flat surface (X-Y plane) and essentially a uniform thickness (Z). The plate-like particles are made by crushing a metal deposition film, and therefore metal particles with essentially a flat surface and essentially a uniform thickness can be obtained. Furthermore, the longitudinal diameter, lateral diameter, and thickness of the plate-like particle can be defined as X, Y, and Z respectively.

The term "diameter of a corresponding circle" refers to the diameter of an imaginary circle which has the same projected surface area as the projected surface area on the essentially flat surface (X-Y plane) of the plate-like particles of the metallic pigment. For example, if the essentially flat surface (X-Y plane) of the plate-like particles of the metallic pigment is polygonal, the diameter of the corresponding circle of the plate-like particle of metallic pigment is the diameter of the circle obtained by converting the projected area of that polygon to a circle.

The 50% average particle diameter R50 of a corresponding circle determined using the surface area of the X-Y plane of the plate-like particles is preferably between 0.5 and 3 μm, and more preferably between 0.75 and 2 μm, from the perspective of metallic gloss and printing stability. If the 50% average particle diameter R50 is less than 0.5 μm, the gloss will be insufficient. On the other hand, if the 50% average particle diameter R50 exceeds 3 μm, the printing stability will be poor.

Furthermore, the relationship between the 50% average particle diameter R50 of a corresponding circle and the thickness Z is preferably such that R50/Z>5, from the perspective of ensuring high metal gloss. If R502 is 5 or less, there will be a problem with insufficient metal gloss.

The maximum particle diameter Rmax of a corresponding circle determined from the area of the plate-like particle in the X-Y plane is preferably 10 μm or less from the perspective of preventing the ink composition from plugging the inkjet recording device. If Rmax is 10 μm or less, plugging of the nozzle in the ink jet recording device and a mesh filter or the like provided in the ink flow path can be prevented.

The metallic pigment is preferably aluminum or an aluminum alloy, from a perspective of cost and a perspective of ensuring metal gloss. If an aluminum alloy is used, the other metal elements or non-metal elements that can be added to the aluminum are not particularly restricted so long as the element has a function that provides metal gloss or the like, but silver, gold, platinum, nickel, chrome, tin, zinc, indium, titanium, and copper and the like can be suggested, and these elements can be favorably used individually, or as an alloy, or as a mixture of at least one type of element.

The method of manufacturing the metallic pigment is to peel the interface between a metal or alloy layer and a peeling resin layer from a sheet substrate of a composite pigment source with a structure where a peeling resin layer and a metal or alloy layer are successively overlaid onto a sheet substrate surface, followed by crushing and pulverizing to obtain plate-like particles. Furthermore, in the case where the longitudinal diameter on the planar surface of the plate-like particle is X, the lateral diameter is Y, and the thickness is Z, the 50% average particle diameter R50 of a corresponding circle determined from the surface area in the X-Y plane of the plate-like particle obtained is between 0.5 and 3 μm, and the condition R50/Z>5 is satisfied.

The longitudinal diameter X, lateral diameter Y, and the diameter of a corresponding circle on the surface of the metallic pigment (plate-like particle) can be measured using a particle image analyzer. For example, a flow type particle image analyzer FPIA-2100, FPIA-3000, or FPIA-3000S manufactured by Sysmex Corporation can be used as a the particle image analyzer.

The particle distribution (CV value) of the metallic pigment (plate-like particles) is determined by the following equation.

$$CV\text{ value} = \text{standard deviation of particle size distribution}/\text{average particle diameter} \times 100 \quad \text{Equation 1}$$

Here, the CV value obtained is preferably 60 or less, more preferably 50 or less, and even more preferably 40 or less. Excellent printing stability can be achieved by selecting a metallic pigment where the CV value is 60 or less.

The metal or alloy layer is preferably made using vacuum deposition, ion plating, or sputtering.

The thickness of the metal or metal alloy is 20 nm or higher and 100 nm or less. Thereby a pigment with an average thickness of 20 nm or higher and 100 nm or less can be obtained. If the average thickness is 20 nm or greater, the pigment will have excellent reflectivity and brightness, and will have good properties as a metallic pigment. If the average thickness is 100 nm or less, the increase of the apparent specific gravity can be suppressed to thereby ensure the dispersion stability of the metallic.

The peeling resin layer of the composite pigments source is an undercoat layer under the metal or alloy layer, and is a peeling layer for increasing the peeling properties to the sheet substrate surface. The resin that is used as the resin peeling layer is preferably a polyvinyl alcohol, polyvinyl butyral, polyethylene glycol, polyacrylic acid, polyacrylamide, cellulose derivative, acrylate polymer, or modified nylon resin.

A solution containing a mixture of one or more of the aforementioned resins is applied to the recording medium, and a layer is formed by drying or the like. The application solution can contain an additive such as a viscosity adjusting agent.

The peeling resin layer can be formed using commonly used gravure application, roller application, blade application, extrusion application, dip application, or spin coat method or the like. After applying and drying, the surface can be smoothed by calendaring if necessary.

The thickness of the peeling resin layer is not particularly restricted, but is preferably between 0.5 and 50 μm, and more preferably between 1 and 10 μm. If the thickness is less than 0.5 μm, the amount of dispersion resin will be insufficient, and if the thickness is greater than 50 μm, peeling at the interface with the pigment layer will readily occur when rolled.

The sheet substrate is not particularly restricted, but can be a polyester film such as polytetrafluoroethylene, polyethylene, polypropylene, and polyethylene terephthalate, a polyamide film such as 66-nylon and 6-nylon, or a peeling film such as a polycarbonate film, triacetate film, or polyamide film, or the like. Preferably, the sheet substrate is made of polyethylene terephthalate or a copolymer thereof.

The thickness of the sheet substrate is not particularly restricted, but is preferably between 10 and 150 μm. If the thickness is 10 μm or greater, handling problems such as processing will not occur, and if the thickness is 150 μm or less, the flexibility will be excellent, and problems will not occur when rolled or peeled or the like.

Furthermore, the metal or alloy layer can be enclosed between protective layers as shown in JP-A-2005-68250. The protective layer can be a silicon oxide layer or a protective resin layer.

The silicon oxide layer is not particularly restricted so long as the layer contains silicon oxide, but is preferably formed from a silicon alkoxide such as tetraalkoxysilane, or polymer thereof.

The silicon oxide layer film is formed by applying a solution of silicon alkoxide or polymer thereof dissolved in alcohol, and then baking.

The protective resin layer is not particularly restricted so long as the resin does not dissolve in the dispersion solvent, and examples include polyvinyl alcohol, polyethylene glycol, polyacrylic acid, polyacrylamide, or a cellulose derivative, and is preferably a polyvinyl alcohol or a cellulose derivative.

An aqueous solution containing a mixture of one or more of the aforementioned resins is applied, and a layer is formed by drying or the like. The application solution can also contain additives such as a viscosity adjusting agent.

Application of the silicon oxide and resin is performed by the same method as application of the peeling resin layer.

The thickness of the protective layer is not particularly restricted, but is preferably in a range between 50 and 150 nm. If the thickness is less than 50 nm, the mechanical strength will be insufficient, but if the thickness exceeds 150 nm, the strength will be too high, so crushing and dispersing will be difficult, and peeling will occur at the interface with the metal or alloy layer.

Furthermore, a layer of colored material can be placed between the "protective layer" and the "metal or alloy layer", as shown in JP-A-2005-68251.

The colored layer is added to obtain a composite pigment of any color, and the materials are not particularly restricted so long as the colored material can provide an arbitrary color or hue, in addition to the metal gloss and brightness of the metallic pigment of the invention. The colored material used in the colored layer can be either a pigment or dye. Furthermore, any commonly used pigment or dye can be suitably used.

In this case, the "pigment" that is used in the colored layer refers to a natural pigment, synthetic organic pigment, or synthetic inorganic pigment or the like as generally defined in the field of pigment chemistry, and is different than the "composite pigment" of the invention formed with a multilayer structure.

The method of forming the colored layer is not particularly restricted, but is preferably formed by coating.

Furthermore, if the colorant that is used in the colored layer is a pigment, a resin for dispersing the colorant is preferably included, and the resin for dispersing the colorant is preferably, made by dispersing or dissolving a pigment, a resin for dispersing the colorant, and other additives if necessary, in a solvent, forming a uniform liquid layer by spin coating this solution, and then drying to make a thin resin film.

Note, when manufacturing the composite pigment source, both the colored layer and the protective layer are preferably formed by coating in order to improve productivity.

The composite pigment source may also have a layered construction with a plurality of multilayered structures of successive peeling resin layers, metal or alloy layers, and protective layers. At this time, the total thickness of the multilayer structure containing a metal or alloy layer, or in other words the thickness of metal or alloy—peeling resin layer—metal or alloy layer, or the peeling resin layer—metal or alloy layer is preferably 5000 nm or less. If the thickness is 5000 nm or less, cracking and peeling will not easily occur even if the composite pigment source is rolled in a roll, so the storage properties will be excellent. Furthermore, when a pigment is formed, the pigment will be favorable, with excellent brightness.

Furthermore, a structure containing multiple successive layers of a peeling resin layer and a metal or an alloy layer on both sides of the sheet substrate surface can be suggested, but this is not a restriction.

The method of peeling from the sheet substrate is not particularly restricted, but a method of immersing the composite pigment source in a liquid, or a method of immersing in a liquid while simultaneously applying ultrasonic waves, peeling, and then crushing the peeled composite pigment are preferable.

With the pigment obtained as described above, the peeling resin layer also acts as a protective colloid, and therefore a stable dispersion can be obtained simply by dispersing in a solvent. Furthermore, with the ink composition that uses this pigment, the resin derived from the peeling resin layer also functions to provide adhesion to the recording medium, such as paper.

Ink Composition

The ink composition of this aspect contains the aforementioned metallic pigment, organic solvent, and resin.

The concentration of metallic pigment in the ink composition is preferably between 0.1 and 3.0 wt %, more preferably between 0.25 and 2.5 wt %, and even more preferably between 0.5 and 2 wt %, if only one type of metallic ink is used in the ink set.

Concerning the concentration of metallic pigment in the ink composition if a plurality of metallic ink compositions are in the ink set, the composition of metal pigment in at least one type of the aforementioned ink compositions is preferably 0.1 wt. % or higher and less than 1.5 wt. %, and the concentration of metal pigment in at least one of the other ink compositions is preferably 1.5 wt. % or higher and 3.0 wt % or less.

If the concentration of metallic pigment in the ink composition is 0.1 wt % or higher and less than 1.5 wt %, a half mirror gloss surface, or in other words a glossy feel can be achieved by spraying an amount of ink that does not sufficiently cover the printing surface, but printing on a texture where the background appears to be transparent will be possible, and a metal glossy surface with high gloss can be formed by spraying sufficient ink to cover the printing surface. Therefore, this is suitable for forming a half mirror image on a transparent recording medium, or for providing a metal gloss surface with high gloss. Furthermore, if the concentration of metallic pigment in the ink composition is 1.5 wt. % or higher and 3.0 wt % or lower, the metal pigment will be randomly arranged on the printing surface, so a high gloss will not be achieved and a metal gloss surface with a matte finish can be formed. Therefore, this is suitable for forming a shielding layer on a transparent recording medium.

The organic solvent is preferably a polar organic solvent, and examples include alcohols (such as methyl alcohol, ethyl alcohol, propyl alcohol, butyl alcohol, isopropyl alcohol, or fluorodated alcohol and the like), ketones (such as acetone, methylethyl ketone, and cyclohexanone and the like), carboxylate esters (such as methyl acetate, ethyl acetate, propyl acetate, butyl acetate, methyl propionate, and ethyl propionate and the like), and ethers (such as diethyl ether, dipropyl ether, tetrahydrofuran, and dioxane, and the like).

In particular, the organic solvent preferably contains one or more types of an alkylene glycol ether that is a liquid at ambient temperature and pressure.

The alkylene glycol ether can be an ethylene glycol based ether or propylene glycol based ether which contains a methyl, n-propyl, i-propyl, n-butyl, i-butyl, hexyl, or 2-ethyl hexyl resin group and an allyl or phenyl group having a double bond as a base. These alkylene glycol ethers are colorless with little odor, and have an ether group and a hydroxyl group in the molecule, and therefore demonstrate the properties of both alcohols and ethers, and are liquid at room temperatures. Furthermore, these alkylene glycol ethers can be monoethers where only one of the hydroxyl groups have been substituted, or can be diethers, where both of the hydroxyl groups have been substituted, and furthermore a plurality of types can be combined and used together.

In particular, the organic solvent is preferably a blend of an alkylene glycol diether, an alkylene glycol monoether, and a lactone.

Examples of the alkylene glycol monoether include ethylene glycol monomethyl ether, ethylene glycol monoethyl ether, ethylene glycol monoisopropyl ether, ethylene glycol monobutyl ether, ethylene glycol monohexyl ether, ethylene glycol monophenyl ether, diethylene glycol monomethyl ether, diethylene glycol monoethyl ether, diethylene glycol monobutyl ether, diethylene glycol dimethyl ether, diethylene glycol diethyl ether, triethylene glycol monomethyl ether, triethylene glycol monoethyl ether, triethylene glycol monobutyl ether, tetraethylene glycol monomethyl ether, tetraethylene glycol monoethyl ether, propylene glycol monomethyl ether, propylene glycol monomethyl ether, dipropylene glycol monomethyl ether, dipropylene glycol monoethyl ether, and the like.

Examples of alkylene glycol diethers include ethylene glycol dimethyl ether, ethylene glycol diethyl ether, ethylene glycol dibutyl ether, diethylene glycol dimethyl ether, diethylene glycol diethyl ether, diethylene glycol dibutyl ether, triethylene glycol dimethyl ether, triethylene glycol diethyl ether, triethylene glycol dibutyl ether, tetraethylene glycol dimethyl ether, tetraethylene glycol diethyl ether, tetraethylene glycol dibutyl ether, propylene glycol dimethyl ether, propylene glycol diethyl ether, dipropytene glycol dimethyl ether, dipropylene glycol diethyl ether, and the like.

Furthermore, the lactone can be γ-butyrolactone, δ-valerolactone, or ε-caprolactone and the like.

The objective of the present invention can be better achieved by using one of the aforementioned favorable constructions.

The resin that is used in the ink composition is for example an acrylic resin, a styrene-acrylic resin, a rosin modified resin, a terpene based resin, a polyester resin, a polyimide resin, an epoxy resin, a vinyichloride resin, a vinylchloride-vinylacetate copolymer, a fiber based resin (such as cellulose acetate buterate, hydroxypropyl cellulose), polyvinyl butyral, polyacrylic polyol, polyvinyl alcohol, and polyurethane and the like.

Furthermore, fine particles of a nonaqueous dispersion polymer can also be used as the resin. These are dispersions where fine particles of polyurethane resin, acrylic resin, acrylic polyol resin or the like are stably dispersed in an organic solvent.

Examples include polyurethane resins such as Sanprene IB-501 and Sanprene IB-F370, manufactured by Sanyo Chemical Industries, Ltd., and acrylicpolyol resins such as N-2043-60MEX and N-2043-AF-1 manufactured by Harima Chemicals, Inc.

The amount of resin emulsion added to the ink composition is preferably 0.1 wt % or higher and 10 wt % or lower, in order to further increase the adhesion of the pigment to the recording medium. If the amount added is excessive, printing stability will not be achieved, but if insufficient, adhesion will be insufficient.

The ink composition preferably contains at least one type of glycerin, polyalkylene glycol, or sugar. The amount of at least one type of glycerin, polyalkylene glycol, or sugar that is added to the ink composition is preferably 0.1 wt % or higher and 10 wt % or lower.

With this type of preferred construction, drying of the ink can be suppressed, plugging can be prevented, spraying of the ink can be stabilized, and the image quality of the recorded matter can be favorable.

The polyalkylene glycol is a linear polymer compound with a construction of repeating ether bonds in the main chain, and is produced for example by ring opening polymerization of a cyclic ether.

Specific examples of polyalkylene glycol include polymers such as polyethylene glycol and polypropylene glycol, ethylene oxide-propylene oxide copolymer and derivatives thereof. The copolymer can be any type of copolymer such as a random copolymer, block copolymer, graft copolymer, or alternating copolymer.

Preferable examples of a polyalkylene glycol include those expressed by the following formula.

$$HO-(C_nH_{2n}O)_m-H$$

(In the above formula, n represents an integer between 1 and 5, and m represents an integer between 1 and 100.)

Note, in the formula, $(C_nH_{2n}O)_m$ can have a single value for n or can have a combination of two or more values within the range of integer n. For example, the term becomes $(C_3H_6O)m$ if n is 3, or becomes $(CH_2O-C_4H_8O)m$ if n is a combination of 1 and 4. Furthermore, the integer m can be a single constant or a combination of two or more constants within the aforementioned range. For instance, in the above example, if m is a combination of 20 and 40, the term becomes $(CH_2O)_{20}-(C_2H_4O)_{40}$, and if m is a combination of 10 and 30, the term becomes $(CH_2O)_{10}-(C_4H_8O)_{30}$. Furthermore, the integers n and m can be in any combination with in the aforementioned ranges.

The sugar can be a simple sugars such as pentose, hexose, heptose, octose, a polysaccharide such as a disaccharide, trisaccharide, or tetrasaccharide, as well as derivatives thereof such as sugar alcohols, reduced derivatives such as deoxy acids, oxidized derivatives such as aldonic acid and uronic acid, dehydrated derivatives such as glycoseen, as well as amino acids and thiosugars and the like. Polysaccharide represent a wide range of saccharides, and include substances widely found in nature such as alginic acid, dextrin, and cellulose.

The ink composition preferably contains at least one type of acetylene glycol based surfactant and/or silicone based surfactant. The amount of surfactant added is preferably 0.01 wt % or higher and 10 wt % or lower, based on the amount of pigment in the ink composition.

With this preferred construction, the wettability of the ink composition towards the recording medium will be improved, and rapid adhesion can be achieved.

Preferred examples of the acetylene glycol based surfactant include Surfinol 465 (trademark), Surfinol 104 (trademark) (product trade names, manufactured by Air Products and Chemicals Inc.), Olfin STG (trademark), Olfin E1010 (trademark) (product trade names, manufactured by Nissin Chemical Industry Co., Ltd.), and the like.

Preferred examples of the silicone surfactant include polyester modified silicone and polyether modified silicone. Specific examples include BYK-347, BYK-348, BYK-UV3500, BYK-UV3570, BYK-UV3510, and BYK-UV3530 (manufactured by BYK Japan).

The ink composition can be prepared by a commonly known and used method. For example, the aforementioned metallic pigment, dispersing agent, and solvent are first blended together and then a pigment dispersion is prepared using a ball mill, bead mill, ultrasonic waves, or jet mill or the like, in order to achieve the desired ink characteristics. Furthermore, a pigment ink composition can be obtained by adding a binder resin, solvent, and other additives (such as dispersion assisting agents and viscosity adjusting agents) while mixing.

In addition, the composite pigment source is ultrasonically treated in a solvent to make a composite pigment dispersion, and then the necessary ink solvents can be blended, or the composite pigment source can be ultrasonically treated in the ink solvent to directly make the ink composition.

The physical properties of the ink composition are not particularly restricted, but for example the surface tension is preferably between 20 and 50 mN/m. If the surface tension is less than 20 mN/m, the ink composition will spread out on the surface of the inkjet recording printer head, or will smear, and spraying ink droplets will be difficult. On the other hand, if the surface tension exceeds 50 mN/m, the ink composition will not spread out on the surface of the recording medium, and favorable printing will not be possible.

Ink Set

The ink set of this aspect contains a plurality of the aforementioned ink compositions, and each of the ink compositions has a different concentration of metal pigment.

Preferably, the concentration of metal pigment in at least one of the ink compositions is 0.1 wt. % or higher and less than 1.5 wt. %, and the concentration of metal pigment in at least one of the other ink compositions is 1.5 wt. % or higher and 3.0 wt % or less.

Recording Device

The recording device of this aspect is an inkjet recording device containing the aforementioned ink set, or the like.

Figure 1:
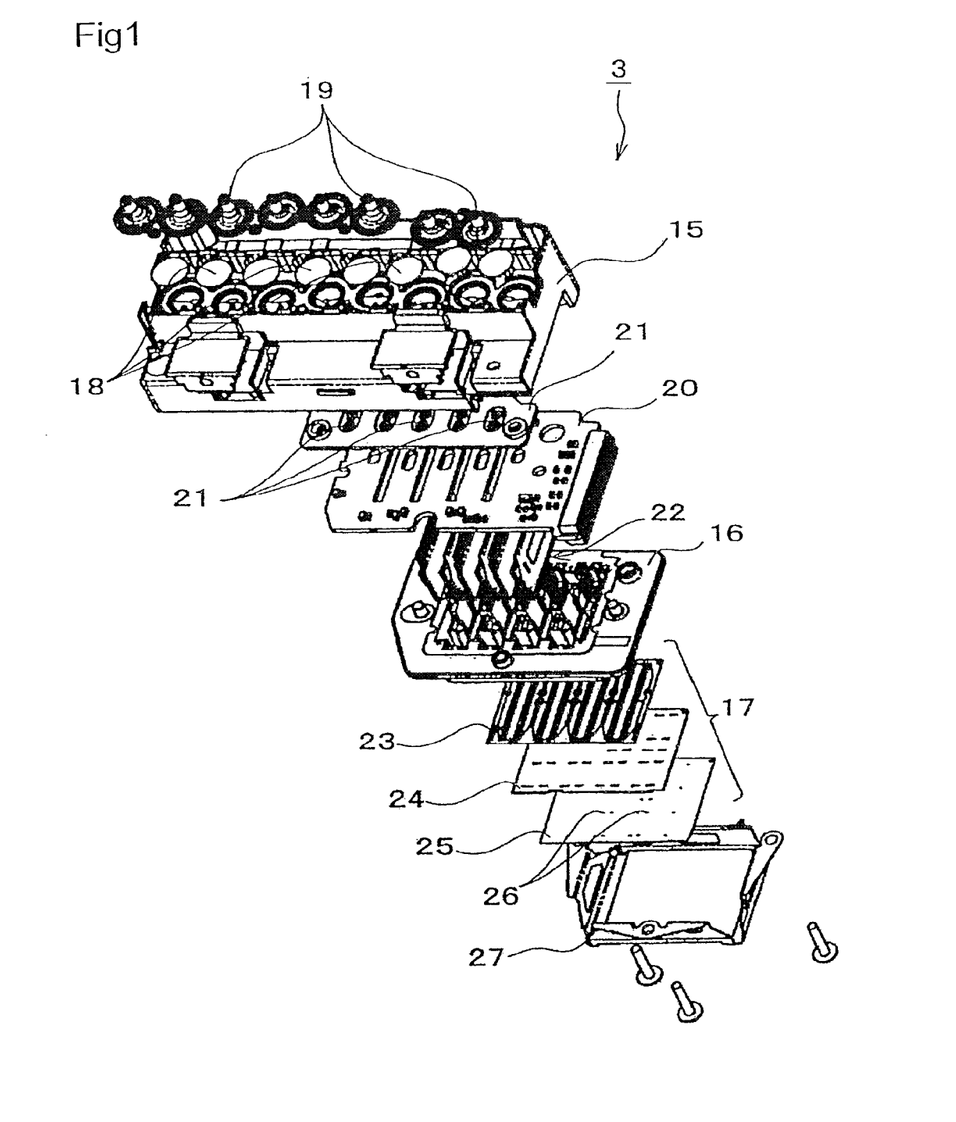
FIG. 1 is an exploded perspective diagram for describing the construction of the recording head.
Figure 2:
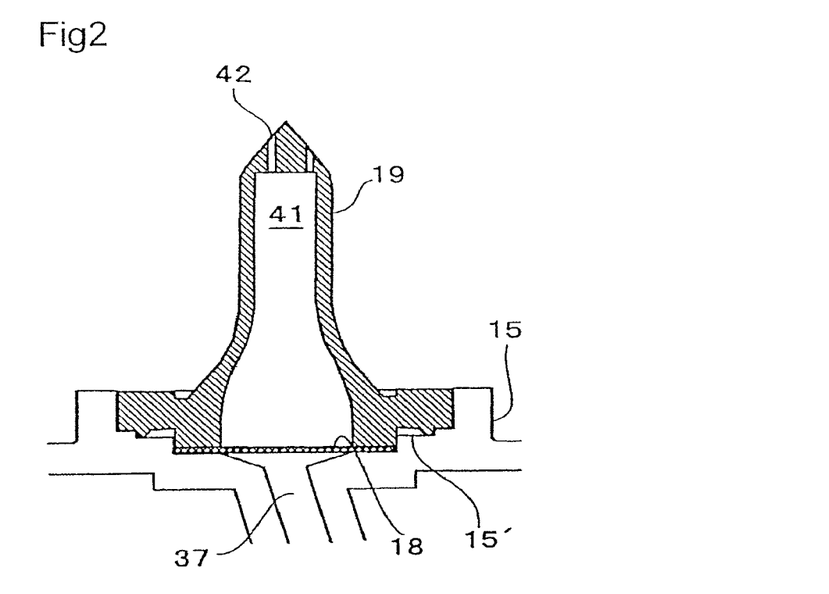
FIG. 2 is a cross section diagram for describing the construction of the ink insertion needle.

The construction of the recording head 3 of the inkjet recording device will be described next. FIG. 1 is a schematic perspective view of a recording head 3 as stored in a carriage (not shown in the drawings). Furthermore, FIG. 2 is a cross-section view of an ink insertion needle 19 that is inserted into the ink cartridge.

The recording head 3 that is shown has a cartridge base 15 (hereinafter referred to as "base"). The base 15 is attached to a head case 16. The leading edge of the head case 16 is attached to (equipped with) a flow path unit 17. The base 15 is molded of a synthetic resin, and a plurality of partitions 15' (liquid storage member devices) are provided on the top surface thereof.

Each of the partitions 15' is attached to an ink insertion needle 19 through a mesh filter 18. Furthermore, the partitions 15' are equipped with an ink cartridge (not shown in the drawings). In other words, the ink cartridges are located on the base 15. The details of the ink insertion needles 19 that are inserted into the ink cartridges will be described later.

A circuit board 20 is attached to other surface of the base 15 opposite to the partitions 15'. Furthermore, this circuit board 20 is attached to the base 15 via a sheet material 21 which acts as packing.

The head case 16 is fixed to the base 15, and is a casing for storing an oscillating unit 22 which contains a piezoelectric oscillating element. Furthermore, a flow path unit 17 is attached with adhesive or the like to the leading edge surface on the opposite side as the base 15 mounting surface of the head case 16. This flow path unit 17 is layered with an elastic plate 23, a flow path forming board 24, and a nozzle plate 25, in succession, and is formed by securing and integrating the layers together with an adhesive or the like.

The nozzle plate 25 is a plate-like member made from a thin stainless steel plate, and has fine nozzle openings 26 arranged in the line at a pitch corresponding to the dot forming density of the printer. Furthermore, the head cover 27 is formed for example from a thin plate member made of metal.

The ink insertion needle 19 that is inserted into the ink cartridge is a hollow needle formed as a conical form at the tip end to the upstream side as shown in FIG. 2, while the inside forms an ink insertion path 41. The bottom part has a taper form that is wider on the upstream side than the downstream side. Furthermore, the leading edge of the ink insertion needle 19 has an ink insertion hole 42 that connects the outside space with the ink insertion flow path 41.

The ink insertion needle 19 is attached to the base 15 with a mesh filter 18 therebetween using ultrasonic welding for example. Thereby the ink insertion path 41 of the ink insertion needle 19 and the ink connecting flow path 37 of the head case 16 can be connected.

Furthermore, when the ink cartridge (not shown in the drawings) is set in a partition 15' of the base 15, the ink insertion needle 19 will be inserted into the ink insertion opening of the ink cartridge, and the inside cavity of the ink cartridge will be connected through the ink insertion hole 42 to the ink insertion path 41 in the ink insertion needle 19. Next, the ink that is stored in the ink cartridge passes through the ink insertion hole 42, enters the ink insertion path 41, passes through the ink connecting flow path 37, and is sprayed from the nozzle opening 26.

If the diameter of the nozzle opening 26 in the recording head 3 of the inkjet recording device is L μm, and the size of the openings in the mesh filter 18 provided in the ink insertion path 41 is W μm, the relationship between the nozzle diameter L μm and the mesh filter opening size W μm is preferably such that $L \geq 5W$. If an ink composition that includes a pigment dispersion of this aspect is used in an inkjet recording device which satisfies this relationship, plugging of the nozzle opening 26 by the metallic pigment can be prevented. Furthermore, from a perspective of ensuring spraying stability of the ink composition, if the average particle diameter as determined from the diameter of a corresponding circle with the same surface area as the X-Y plane is R μm, the number of plate-like particles which satisfy the condition of $R > (L/5)$ is preferably 5% or less of the total number of plate-like particles.

The ink composition of the present invention can be used for recording by spraying droplets thereof and causing those droplets to adhere to a recording medium.

From the viewpoint of angular dependency, an image is preferably formed where the measurement values for the specular gloss of the recording medium at angles of 20°, 60°, and 85° as defined by JIIS Z 8741 are simultaneously no less than 200, 200, and 100, more preferably the measurement values for the specular gloss of the recording medium at angles of 20°, 60°, and 85° as defined by JIS Z 8741 are simultaneously no less than 400, 400, and 100, and even more preferably the measurement values for the specular gloss of the recording medium at angles of 20°, 60°, and 85° as defined by JIS Z 8741 are simultaneously no less than 600, 600, and 100.

An image which has measured values for the specular gloss of the recording medium at angles of 20°, 60°, and 85° as defined by JIS Z 8741 are simultaneously no less than 200 or higher but less than 400, 200 or higher but less than 400, and 100 or higher, respectively, will have a metallic gloss that is a flat gloss finish (matte finish).

An image which has measured values for the specular gloss of the recording medium at angles of 20°, 60°, and 85° as defined by JIS Z 8741 are simultaneously no less than 400 or higher but less than 600, 400 or higher but less than 600, and 100 or higher, respectively, will have a metallic gloss that is has some shine to the degree that an object reflected in the image that is formed will be somewhat distinguishable.

A metallic glossy image with measured values for the specular gloss at angles of 20°, 60°, and 85° as defined by JIS Z 8741 are simultaneously 600 or higher, 600 or higher, and 100 or higher, respectively, will be sharp, and will have a metallic gloss that has so-called "mirror gloss" to the degree that an object reflected in the image that is formed will be clearly distinguishable.

Therefore, when recording using the ink composition of the invention, an image can be formed with the desired metallic gloss, from a matte finish image to a gloss finish image by appropriately combining images with a metallic gloss where the specular gloss measured at 20°, 60°, and 85° is no less than 200, 200, and 100 respectively, as measured on the aforementioned recording medium in accordance with JIS Z 8741.

On the other hand, if measurement values for the specular gloss at 20°, 60°, and 85° does not exceed 200, 200, and 100, the image will not have a metallic glossy feel when visually observed, but rather will appear to be gray. Furthermore, if the measured value for the specular gloss at 20°, 60°, and 85° does not exceed any one of the aforementioned values, the effects of the invention will not be achieved.

From the perspective of ensuring the metallic gloss, the perspective of printing process, and the perspective of cost, the amount of ink composition that is sprayed onto the recording medium is preferably between 0.1 and 100 mg/cm$^2$, and more preferably between 1.0 and 50 mg/cm$^2$.

The dry weight of the metallic pigment that forms an image on the recording medium is preferably between 0.0001 and 3.0 mg/cm$^2$, from the perspective of metallic gloss, printing process, and cost. A lower dry weight of the metallic pigment will provide a metallic glossy surface with high gloss. Therefore, this is suitable for forming a half mirror image on a transparent recording medium. Furthermore, if the dry weight of the metallic pigment is higher, a metallic glossy surface with a matte finish can be achieved. Therefore, this is suitable for forming a shielding layer on a transparent recording medium.

The method described below is suggested as a method for spraying the ink composition.

A first method is an electrostatic aspiration method, and is a system of recording by applying a strong electric field between a nozzle and an acceleration electrode placed in front of the nozzle, continuously spraying droplets of ink from the nozzle, and while the ink droplets are traveling between the deflecting electrodes, applying a printing information signal to the deflecting electrode, or a system of spraying ink droplets corresponding to the printing information signal without deflection.

A second method is a method of forcefully spraying ink droplets by mechanically vibrating a nozzle using a water crystal oscillator while applying pressure on the ink solution using a small pump. The ink droplets that are sprayed are electrically charged while being sprayed, a printing information signal is applied to a deflecting electrode while the ink droplets are traveling between the deflection electrodes.

A third method is a system that uses a piezoelectric element, where recording is performed by simultaneously applying pressure and a printing information signal to the ink solution using a piezoelectric element, and spraying the ink droplets.

A fourth method is a method where the ink solution is suddenly expanded in volume by the effect of thermal energy, and uses a system where recording is performed by heating an ink solution to form bubbles using an ultra-small electrode in accordance with a printing information signal, and spraying the ink droplets.

Any of the aforementioned methods can be used with the inkjet recording method of this embodiment, but the method of spraying the ink composition without heating is preferable from the perspective of printing at high speed. In other words, the first method, second method, or third method are preferably used.

The recording medium is not particularly restricted, and for example, various types of recording media can be used, such as normal paper, special inkjet paper (matte paper, glossy paper), glass, plastic film such as polyvinylchloride, film where a substrate is coated with a plastic or reception layer, metal, or printed circuit boards or the like.

If the recording medium has an ink reception layer, the recording medium is preferably printed without heating, from the perspective of avoiding heat damage.

On the other hand, from the perspective of achieving a high gloss, if the recording medium does not has an ink reception layer, the recording medium is preferably heated and printed.

The method of heating can be a method of heating by bringing the recording medium into contact with a heating source, or irradiating with infrared rays or microwaves (electromagnetic waves with extremely large wave length of approximately 2,450 MHz) or the like, or heating by blowing hot air without contacting the recording medium, and the like.

The heating is preferably performed prior to printing and/or during printing and/or after printing. In other words, the recording medium can be heated prior to printing, at the same time as printing, or after printing, or heating can be performed throughout the printing process. The heating temperature is dependent on the type of recording medium, but is preferably between 30 and 80° C., more preferably between 40 and 60° C.

With the ink composition of the invention, recording can be performed using the aforementioned inkjet recording method. The recorded matter can be obtained using an ink set that includes the aforementioned ink composition, and therefore recorded matter can be obtained which has a high metallic mirror gloss with a specular gloss at angles of 20°, 60°, 85° of no less than 200, 200, and 100 respectively. Furthermore, the concentration of metallic pigment in the ink compositions that make the ink set varies for each ink composition, and therefore arbitrary levels of metallic gloss, ranging from mirror gloss to matte finish, can be simultaneously formed.

EXAMPLES

Example A

1. Preparation of Metallic Pigment Dispersion

A resin coating solution containing 3.0 wt % of cellulose acetate buterate (butylation ratio between 35 and 39%, manufactured by Kanto Chemical Co., Inc.) and 97 wt % diethylene glycol diethyl ether (manufactured by Nippon Nyukazai Co., Ltd.) was uniformly applied by a bar coating method onto a 100 μm thick PET film, and then dried for 10 minutes at 60° C. to form a thin resin film on a PET film.

Next, an aluminum vapor deposition layer with an average thickness of 20 nm was formed on the aforementioned resin layer using a vacuum deposition device (vacuum deposition device model VE-1010 manufactured by Vacuum Device Co.).

Next, the multilayer body formed by the aforementioned method was simultaneously peeled, pulverized, and dispersed in the diethylene glycol diethyl ether using a VS-150 ultrasonic disperser (manufactured by As One Corporation), and a metallic pigment dispersion was formed by ultrasonically dispersing for 12 cumulative hours.

The metallic pigment dispersion that was obtained was filtered using an SUS mesh filter with 5 μm openings to remove the coarse particles. Next, the filtrate was poured into a round bottomed flask and the diethylene glycol diethyl ether was distilled off using a rotary evaporator. Thereby the metallic pigment dispersion was concentrated, and later the concentration of the metallic pigment dispersion was adjusted to obtain a metallic pigment dispersion 1 with a concentration of 5 wt %.

Furthermore, metallic pigment dispersions 2 through 11 were prepared using metallic pigment where the vapor deposition conditions and/or the ultrasonic dispersing time were changed.

Furthermore, the 50% average particle diameter R50 of a corresponding circle in the longitudinal diameter (X direction)-lateral diameter (Y direction) plane of each of the metallic pigments and the average thickness Z were measured using a particle diameter and grain distribution analyzer (FPIA-3000S manufactured by Sysmex Corp.), and R50/Z was calculated based on the measurement values obtained for R50 and Z. Note, the particle size distribution (CV value) was determined by the equation CV value=standard deviation of the particle size distribution/average particle size×100. The results are shown in Table 1.

TABLE 1

| Metallic pigment dispersion | 50% average particle diameter R50 (μm) | Particle size distribution (CV value) | Average particle diameter Rmax (μm) | Average film thickness Z (μm) | R50/Z |
|---|---|---|---|---|---|
| 1 | 1.03 | 44.0 | 4.9 | 0.02 | 51.5 |
| 2 | 1.43 | 48.9 | 6.9 | 0.02 | 71.5 |
| 3 | 2.54 | 47.2 | 7.2 | 0.02 | 127.0 |
| 4 | 1.13 | 44.8 | 5.9 | 0.02 | 56.5 |
| 5 | 1.02 | 48.4 | 5.7 | 0.03 | 34.0 |
| 6 | 0.91 | 45.1 | 4.2 | 0.02 | 45.5 |
| 7 | 0.86 | 46.6 | 4.3 | 0.02 | 43.0 |
| 8 | 0.89 | 38.2 | 3.2 | 0.02 | 44.5 |
| 9 | 5.52 | 81.2 | 30 | 0.10 | 55.2 |
| 10 | 1.42 | 65.0 | 12 | 0.30 | 4.7 |
| 11 | 1.40 | 60.2 | 7.1 | 0.30 | 4.7 |

2. Preparation of the Metallic Pigment Ink Composition

Metallic pigment ink compositions were prepared according to the formulations shown in Table 2 and Table 3 using the metallic pigment dispersion that was prepared by the aforementioned method. After blending and dissolving the solvent and additives to make the ink solvent, the metallic pigment dispersion was added to the ink solvent, and then blended and stirred using a magnetic stirrer for 30 minutes at ambient temperature and pressure to make a metallic pigment ink composition.

The diethylene glycol diethyl ether (DEGDE), dipropylene glycol monobutyl ether (DPGMB), and tetraethylene glycol dimethyl ether (TEGDM) shown in Table 2 and Table 3 are manufactured by Nippon Nyukazai Co. Ltd. Furthermore, the γ-butyrolactone is manufactured by Kanto Chemical Co. Inc. In addition, the N-2043-60MEX and N-2043-AF-1 (resin emulsion) is manufactured by Harima Chemical Co. Inc., and the BYK-3500 (surfactant) is manufactured by BYK Japan. Note, the units are in wt %.

TABLE 2

| Ink Composition | Example 1 | 2 | 3 | 4 | 5 | 6 | 7 | 8 | Comparative example 1 | 2 | 3 |
|---|---|---|---|---|---|---|---|---|---|---|---|
| DEGDE | 47.8 | 47.8 | 47.8 | 61.8 | 61.8 | 61.8 | 61.8 | 61.8 | 47.8 | 47.8 | 47.8 |
| GPGMB | 45 | 45 | 45 | | | | | | 45 | 45 | 45 |
| γ-butyrolactone | | | | 15 | 15 | 15 | 15 | 15 | | | |
| TEGDM | | | | 18 | 18 | 18 | 18 | 18 | | | |
| N-2043-AF-1 | 6.0 | 6.0 | 6.0 | 4.0 | 4.0 | 4.0 | 4.0 | 4.0 | 6.0 | 6.0 | 6.0 |
| BYK-3500 | 0.20 | 0.20 | 0.20 | 0.20 | 0.20 | 0.20 | 0.20 | 0.20 | 0.20 | 0.20 | 0.20 |
| Pigment solid content | 1.0 | 1.0 | 1.0 | 1.0 | 1.0 | 1.0 | 1.0 | 1.0 | 1.0 | 1.0 | 1.0 |
| (metallic pigment dispersion) | (1) | (2) | (3) | (4) | (5) | (6) | (7) | (8) | (9) | (10) | (11) |

TABLE 3

| Ink Composition | Example 11 | 12 | 13 | 14 |
|---|---|---|---|---|
| DEGDE | 47.8 | 61.8 | 61.3 | 63.8 |
| GPGMB | 45 | — | — | — |
| γ-butyrolactone | — | 15.0 | 15.0 | 15.0 |
| TEGDM | — | 18.0 | 18.0 | 18.0 |
| N-2043-60MEX | 6.0 | 4.0 | 4.0 | 2.0 |
| BYK-UV3500 | 0.20 | 0.20 | 0.20 | 0.20 |
| Pigment solid content | 1.0 | 1.0 | 1.5 | 1.0 |
| (metallic pigment dispersion) | (8) | (8) | (8) | (8) |

3. Evaluation Test (1) Spray Stability

A black block was filled with an ink composition using an inkjet printer EM-930C (manufactured by Seiko Epson Corp.), and solid fill printing was performed at ambient temperature on photographic paper (glossy) manufactured by the same company (Product Number: KA450PSK).

At this time, the inkjet printer nozzle diameter (L) was 25 μm, and the size of the openings (W) of the mesh filter in the ink flow path was 5 μm. Therefore, the inkjet printer that was used had a relationship where L=5W. Furthermore, a ratio (%) was calculated for the number of plate-like particles where the relationship between the average particle diameter (R) of a corresponding circle determined from the surface area in the X-Y plane of the plate-like particles that were included in the ink composition and the nozzle diameter (L) of the inkjet printer satisfied the condition of R>(L/5).

The solid fill printed image obtained was visually observed for the presence of spray defects (nozzle skipping), and the spray stability was evaluated according to the following evaluation criteria. Note, "nozzle skipping" refers to areas where ink should have been sprayed from a nozzle on a normal print head but was not sprayed because of nozzle plugging, thus affecting the printing results. The evaluation results are shown in Tables 4-5 along with the ratio (%) of the number of plate-like particles satisfying the condition R>(L/15).

AA: Spray defects (nozzle skipping) did not occur even when continuously printing an A4 size solid filled image on 30 consecutive sheets.

A: Spray defects (nozzle skipping) did not occur even when continuously printing an A4 size solid filled image on 10 consecutive sheets.

B: Spray defects (nozzle skipping) occurred between the second and 9$^{th}$ sheets when a A4 size solid filled image was continuously printed.

C: Spray defects (nozzle skipping) occurred on the first page when continuously printing an A4 size solid filled image.

(2) Gloss Measurement

A black block was filled with an ink composition using an inkjet printer EM-930C (manufactured by Seiko Epson Corp.), and solid fill printing was performed at ambient temperature on photographic paper with an ink reception layer (glossy) manufactured by the same company (Product Number: KA450PSK). The amount of ink composition that was sprayed at this time was 1.2 mg/cm$^2$, and the dried weight of the metal pigment was 12 μg/cm$^2$. The gloss of the image obtained was measured using a gloss meter (MULTI Gloss 268, manufactured by Konica Minolta Co., Ltd.). The results are shown in Table 4 and Table 5.

TABLE 4

| | Recording and printing stability | R > L/5 (%) | Gloss 20° gloss | 60° gloss | 85° gloss |
|---|---|---|---|---|---|
| Example 1 | A | 1.2 | 283 | 363 | 107 |
| Example 2 | A | 1.1 | 401 | 411 | 110 |
| Example 3 | A | 4.4 | 225 | 372 | 103 |
| Example 4 | A | <0.1 | 895 | 604 | 125 |
| Example 5 | A | <0.1 | 733 | 553 | 121 |
| Example 6 | A | <0.1 | 560 | 547 | 124 |
| Example 7 | A | <0.1 | 626 | 483 | 120 |
| Example 8 | AA | <0.1 | 663 | 506 | 123 |
| Comparative Example 1 | C | 50 | — | — | — |
| Comparative Example 2 | B | 3.1 | 171 | 311 | 104 |
| Comparative Example 3 | B | 4.3 | 333 | 409 | 116 |

—: Not detected

TABLE 5

| | Recording and printing stability | R > L/5 (%) | Gloss 20° gloss | 60° gloss | 85° gloss |
|---|---|---|---|---|---|
| Example 11 | AA | <0.1 | 350 | 434 | 116 |
| Example 12 | AA | <0.1 | 895 | 604 | 125 |
| Example 13 | AA | <0.1 | 782 | 592 | 125 |
| Example 14 | AA | <0.1 | 940 | 604 | 128 |

(3) Evaluation of Thermal Printing

The ink composition of example 1 was filled in the yellow block using an inkjet printer SJ-540 (manufactured by Roland DG Corp.), and then solid fill printing and thermal printing was performed on a glossy polyvinyl chloride film (with gray adhesive) which did not have an ink reception layer (product number: SP-SG-1270G). Next, the gloss of the image obtained was measured using a gloss meter (MULTI Gloss 268, manufactured by Konica Minolta Co., Ltd.). The results and the heating conditions are shown in Table 6. Note, the heating conditions are for the case where heating to 40° C. was performed during printing (example 9) and for the case where heating was performed in a dryer at 60° C. after printing at ambient temperature (example 10). Furthermore, for comparison, the case where only ambient temperature printing was performed without heating (reference example) was also evaluated.

Similarly, an evaluation was also performed in a manner similar to example 9 except that the ink composition of example 13 was used (example 15).

TABLE 6

| | (3) Thermal printing evaluation | | | |
|---|---|---|---|---|
| | 20° gloss | 60° gloss | 85° gloss | Heating conditions |
| Example 9 | 260 | 405 | 120 | 40° C. during printing |
| Example 10 | 218 | 406 | 117 | 60° C. after printing |
| Reference example | 99 | 214 | 68 | No heating |

TABLE 7

| | (3) Thermal printing evaluation | | | |
|---|---|---|---|---|
| | 20° gloss | 60° gloss | 85° gloss | Heating conditions |
| Example 15 | 275 | 408 | 116 | 40° C. during printing |

Example B

1. Preparation of Metallic Pigment Dispersion

A dispersion containing a metallic pigment was prepared similar to Example A.

2. Preparation of the Metallic Pigment Ink Composition

Metallic pigment ink compositions were prepared according to the formulations shown in Table 8 and Table 9 using the metallic pigment dispersion that was prepared for example A. After blending and dissolving the solvent and additives to make the ink solvent, the metallic pigment dispersion was added to the ink solvent, and then blended and stirred using a magnetic stirrer for 30 minutes at ambient temperature and pressure to make a metallic pigment ink composition.

The diethylene glycol diethyl ether (DEGDE) and the tetraethylene glycol dimethyl ether (TEGDM) shown in Table 8 and Table 9 are manufacture by Nippon Nyukazai Co. Ltd. Furthermore, the γ-butyrolactone was manufactured by Kanto Chemical Co. Inc. In addition, the N-2043-60MEX and N-2043-AF-1 (resin emulsion) are manufactured by Harima Chemical Co. Inc., and the BYK-3500 (surfactant) is manufactured by BYK Japan. Note, the units are in wt %.

TABLE 8

| Ink Composition | Examples | | | | | Comparative Examples | | |
|---|---|---|---|---|---|---|---|---|
| | 16 | 17 | 18 | 19 | 20 | 4 | 5 | 6 |
| DEGDE | 64.30 | 64.05 | 63.80 | 63.30 | 62.80 | 64.05 | 63.80 | 62.80 |
| γ-butyrolactone | 15.0 | 15.0 | 15.0 | 15.0 | 15.0 | 15.0 | 15.0 | 15.0 |
| TEGDM | 18.0 | 18.0 | 18.0 | 18.0 | 18.0 | 18.0 | 18.0 | 18.0 |
| N-2043-AF-1 | 2.0 | 2.0 | 2.0 | 2.0 | 2.0 | 2.0 | 2.0 | 2.0 |
| BYK-3500 | 0.2 | 0.2 | 0.2 | 0.2 | 0.2 | 0.2 | 0.2 | 0.2 |
| Pigment solid content | 0.50 | 0.75 | 1.00 | 1.50 | 2.00 | 0.75 | 1.00 | 2.00 |
| (metallic pigment dispersion) | (4) | (4) | (4) | (4) | (4) | (10) | (10) | (10) |

TABLE 9

| | Examples | | |
|---|---|---|---|
| Ink Composition | 21 | 22 | 23 |
| DEGDE | 64.05 | 63.80 | 63.30 |
| γ-butyrolactone | 15.0 | 15.0 | 15.0 |
| TEGDM | 18.0 | 18.0 | 18.0 |
| N-2043-60MEX | 2.0 | 2.0 | 2.0 |
| BYK-3500 | 0.2 | 0.2 | 0.2 |
| Pigment solid content | 0.75 | 1.00 | 1.50 |
| (metallic pigment dispersion) | (8) | (8) | (8) |

3. Evaluation Test (1) Gloss Measurement

A black block was filled in with an ink composition using an inkjet printer EM-930C (manufactured by Seiko Epson Corp.), and solid fill printing was performed at ambient temperature on photographic paper with an ink reception layer (glossy) manufactured by the same company (Product Number: KA450PSK). The amount of ink composition that was sprayed at this time was 1.2 mg/cm$^2$, and the dried weight of the metal pigment was 12 μg/cm$^2$. The gloss of the image obtained was measured using a gloss meter (MULTI Gloss 268, manufactured by Konica Minolta Co., Ltd.). Furthermore, functional evaluation of the printed matter was based on the following evaluation standard. The results are shown in Table 10 and Table 11.

AA: Mirror gloss (a reflected object can easily be determined. Sharpness)

A: Glossy (A metal gloss is observed, but there is no sharpness.)

B: Matte finish (metallic gloss with no shine)
C: Gray finish (Metal gloss is not observed, and appearance is gray.)

TABLE 10

| | Gloss | | | Functional Evaluation of Printed Matter |
|---|---|---|---|---|
| | 20° gloss | 60° gloss | 85° gloss | |
| Example 16 | 331 | 345 | 118 | B |
| Example 17 | 698 | 510 | 123 | AA |
| Example 18 | 895 | 604 | 125 | AA |
| Example 19 | 782 | 592 | 125 | AA |
| Example 20 | 531 | 512 | 120 | A |
| Comparative example 4 | 158 | 286 | 102 | C |
| Comparative example 5 | 171 | 311 | 104 | C |
| Comparative example 6 | 117 | 301 | 106 | C |

TABLE 11

| | Gloss | | | Functional Evaluation of Printed Matter |
|---|---|---|---|---|
| | 20° gloss | 60° gloss | 85° gloss | |
| Example 21 | 910 | 571 | 124 | AA |
| Example 22 | 940 | 604 | 128 | AA |
| Example 23 | 826 | 595 | 126 | AA |

From the above results, it can be seen that the ink compositions (examples 16 through 20) used in the ink set of the invention can form an image with different levels of metal gloss according to the concentration of metallic pigment. Therefore, an ink set that contains ink compositions with different concentrations of metallic pigment can simultaneously print printed matter which has a high metallic mirror gloss with a specular gloss at angles of 20°, 60°, and 85° of 200, 200, and 100 or higher, respectively, and which has gloss ranging from mirror gloss to a matte finish.

The invention claimed is:

1. An ink composition comprising a metal pigment, wherein the metal pigment contains plate-like particles, and in the case where the longitudinal diameter on the planar surface of the plate-like particle is X, the lateral diameter is Y, and the thickness is Z, the 50% average particle diameter R50 of a corresponding circle determined from the surface area in the X-Y plane of the plate-like particle is 3 µm or less, and the condition R50/Z>5 is satisfied; and
   wherein when applied to an inkjet recording device having L µm is the nozzle diameter of an inkjet head, the number of plate-like particles where a particle diameter R µm of a corresponding circle determined from the surface area in the X-Y plane of the plate-like particles satisfies a condition R>(L/5) being no more than 5% of a total number of the plate-like particles.

2. The ink composition according to claim 1, wherein the maximum particle diameter Rmax of a corresponding circle determined from the surface area in the X-Y plane of the plate-like particles is 10 µm or less.

3. The ink composition according to claim 1, wherein the metal pigment is aluminum or an aluminum alloy.

4. The ink composition according to claim 1, wherein the metal pigment is made by crushing a metal deposition film.

5. The ink composition according to claim 1, wherein the particle size distribution CV value of the metal pigment as determined by the following Equation 1 is 60 or less:

CV value=standard deviation of particle size distribution/average particle diameter×100.    Equation 1

6. The ink composition according to claim 1, wherein the concentration of the metal pigment in the ink composition is between 0.1 and 3.0 wt %.

7. The ink composition according to claim 1, further comprising an organic solvent and a resin.

8. The ink composition according to claim 7, wherein the organic solvent includes one or more type of alkylene glycol ether that is a liquid at ambient temperature and pressure.

9. The ink composition according to claim 7, wherein the organic solvent is a blend of an alkylene glycol diether, an alkylene glycol monoether, and a lactone.

10. The ink composition according to claim 7, wherein the resin is at least one type of resin selected from a group consisting of polyvinyl butyral, cellulose acetatobutyrate, and polyacryllic polyol.

11. The ink composition according to claim 1, further comprising at least one type of acetylene glycol based surfactant and/or silicone based surfactant.

12. An ink set, comprising a plurality of the ink compositions according to claim 1, wherein each of the ink compositions has a different concentration of metal pigment.

13. The ink set according to claim 12, wherein the concentration of a metal pigment in at least one of the ink compositions is 0.1 wt. % or higher and less than 1.5 wt. %, and the concentration of a metal pigment in at least one of the other ink compositions is 1.5 wt. % or higher and 3.0 wt % or less.

14. A recording device, comprising the ink set according to claim 12.

15. The recording device according to claim 14, wherein the recording device comprises an inkjet head with the diameter of the nozzle, the diameter of the nozzle is L µm.

16. A recording device comprising:
   (a) an inkjet head with the diameter of the nozzle, the diameter of the nozzle is L µm, and
   (b) an ink composition comprising a metal pigment, wherein the metal pigment contains plate-like particles, and in the case where the longitudinal diameter on the planar surface of the plate-like particles is X, the lateral diameter is Y, and the thickness is Z, the 50% average particle diameter R50 of a corresponding circle determined from the surface area in the X-Y plane of the plate-like particles is 3 µm or less, and the condition R50/Z>5 is satisfied,
   wherein the number of plate-like particles where a particle diameter R µm of a corresponding circle determined from the surface area in the X-Y plane of the plate-like particles satisfies a condition R>(L/5) is no more than 5% of a total number of the plate-like particles.

* * * * *